(12) United States Patent
Six et al.

(10) Patent No.: US 11,186,014 B2
(45) Date of Patent: Nov. 30, 2021

(54) PROCESS FOR SHAPING AND PROCESS FOR IMPREGNATING A FIBROUS PREFORM

(71) Applicant: SAFRAN AIRCRAFT ENGINES, Paris (FR)

(72) Inventors: Pauline Nathalie Six, Moissy-Cramayel (FR); Nicolas Cambyse Ashtari, Moissy-Cramayel (FR); Hubert Jean Marie Fabre, Moissy-Cramayel (FR); Jérémy Hellot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 92 days.

(21) Appl. No.: 16/642,609

(22) PCT Filed: Aug. 29, 2018

(86) PCT No.: PCT/FR2018/052119
§ 371 (c)(1),
(2) Date: Feb. 27, 2020

(87) PCT Pub. No.: WO2019/043335
PCT Pub. Date: Mar. 7, 2019

(65) Prior Publication Data
US 2020/0206978 A1    Jul. 2, 2020

(30) Foreign Application Priority Data

Aug. 30, 2017   (FR) ...................................... 1757984

(51) Int. Cl.
*B29B 11/16*      (2006.01)
*B29C 70/32*      (2006.01)
(Continued)

(52) U.S. Cl.
CPC .............. *B29B 11/16* (2013.01); *B29C 70/48* (2013.01); *B29C 70/32* (2013.01);
(Continued)

(58) Field of Classification Search
CPC .......... B29B 11/16; B29C 70/32; B29C 70/48
See application file for complete search history.

(56) References Cited

U.S. PATENT DOCUMENTS 5,368,253 A    11/1994  Hartley
8,524,026 B2 *  9/2013  Mathon ................. F01D 21/045
                                                        156/189
(Continued)

FOREIGN PATENT DOCUMENTS

EP    1 961 923 A2    8/2008
FR    2993815 A  *   1/2014
(Continued)

OTHER PUBLICATIONS

International Search Report as issued in International Patent Application No. PCT/FR2018/052119, dated Dec. 7, 2018.

*Primary Examiner* — Jeffry H Aftergut
(74) *Attorney, Agent, or Firm* — Pillsbury Winthrop Shaw Pittman LLP (57) ABSTRACT

A process for shaping a fibrous preform includes the insertion of each attachment tab of a fibrous texture into a corresponding aperture of an impregnation mandrel, the attachment by a removable retaining device of each tab inserted into each aperture against a surface of the impregnation mandrel, the winding under tension of the fibrous texture on the impregnation mandrel in order to obtain a fibrous preform.

10 Claims, 9 Drawing Sheets

(51) Int. Cl.
  *B29C 70/48*   (2006.01)
  *B29L 31/08*   (2006.01)
  *B29L 31/00*   (2006.01)
  *D03D 25/00*   (2006.01)
  *F01D 25/24*   (2006.01)

(52) U.S. Cl.
  CPC ... *B29L 2031/08* (2013.01); *B29L 2031/7504* (2013.01); *D03D 25/005* (2013.01); *F01D 25/24* (2013.01); *F05D 2220/323* (2013.01); *F05D 2300/603* (2013.01)

(56) References Cited

U.S. PATENT DOCUMENTS 10,315,367 B2 * 6/2019 Camus .................. B65H 75/28
2010/0288429 A1   11/2010 Mathon et al.

FOREIGN PATENT DOCUMENTS

FR      3 040 653 A1   3/2017
WO  WO 2013/060965 A1  5/2013

* cited by examiner

PROCESS FOR SHAPING AND PROCESS FOR IMPREGNATING A FIBROUS PREFORM

CROSS-REFERENCE TO RELATED APPLICATIONS

This application is the U.S. National Stage of PCT/FR2018/052119, filed Aug. 29, 2018, which in turn claims priority to French patent application number 1757984 filed Aug. 30, 2017. The content of these applications are incorporated herein by reference in their entireties.

BACKGROUND OF THE INVENTION

The invention relates to the field of gas turbine casings, and more particularly containment casings for gas turbine fans for aeronautical engines.

In an aeronautical gas turbine engine, a fan casing fulfils several functions. It defines the air intake duct in the engine, supports an abradable material facing the tips of the vanes of the fan, supports where applicable a structure for absorbing soundwaves for acoustic processing at the engine intake and incorporates or supports a containment shield. The latter constitutes a trap retaining debris, such as ingested objects or fragments of damaged vanes, projected by centrifugation, in order to avoid them crossing the casing and reaching other parts of the aircraft.

The production of a fan containment casing made of composite material has already been proposed. One may for example refer to the document EP 1,961,923 which describes the manufacturing of a casing made of composite material of varying thickness comprising the formation of a fibrous reinforcement by superimposed layers of a fibrous texture and the densification of the fibrous reinforcement by a matrix. According to this invention, the fibrous texture is produced by three-dimensional weaving with varying thickness and is wound in several superimposed layers on a mandrel with a profile corresponding to that of the casing to be manufactured. The fibrous preform thus obtained is retained on the mandrel and an impregnation by resin is performed before polymerization. The winding on a mandrel of a fibrous texture of varying thickness described in this document makes it possible to directly dispose of a tubular preform having the desired profile with a variable thickness.

In practice, the implementation of this process poses the problem of the retainment of the fibrous preform during its winding on the mandrel. During this winding, it is specifically advisable to exert a sufficient tensile force on each layer of fibrous texture to ensure an effective compressing thereof. This in particular requires the first layer of fibrous texture that is wound on the mandrel to be correctly bound to it before winding the next layers.

For this purpose, it is known to use a tackifier to bond approximately one quarter of the first turn of the fibrous texture during its winding on the mandrel, thus making it possible to make it adhere to the tool. Such a solution does however require the preparation of the product, leading to an increase in the manufacturing time of the casing. The tackifier is furthermore a chemical agent that can potentially have an adverse effect on the safety and health of the operators. Moreover, despite the application of a tackifier it is possible to envision the risk that the fibrous texture may, during the winding of its first turn, slip in relation to the mandrel. Such a slipping risk is impossible to detect or measure once the other layers of the fibrous texture are wound on the mandrel. To obviate such a risk, in addition to the tackifier, attachment clamps can be put in place to retain the fibrous texture on the mandrel during the winding of the first turn of the fibrous texture. After this first turn, the covering of the fibrous texture by itself then supplies a compressive force sufficient for it to dispense with the clamps and ensure the proper adhesion of the fibrous texture on the mold using the tackifier. The time of shaping of the casing preform from the winding of the fibrous texture is thus extended even further thereby.

PURPOSE AND SUMMARY OF THE INVENTION

The aim of this invention is to remedy the aforementioned drawbacks. More precisely, this invention has notably the aim of proposing a solution making it possible to dispense with the use of a tackifier during the winding of the fibrous texture around the mandrel, reduce the manufacturing time of the casing obtained from this fibrous texture and improve the safety of the operators.

For this purpose, the invention proposes a process for shaping a fibrous preform implementing an installation comprising a storage mandrel intended to store a fibrous texture in the form of a wound strip, an impregnation mandrel comprising an external surface and an internal surface opposite the external surface, a device for conveying the fibrous texture between the storage mandrel and the impregnation mandrel, inserted into at least one aperture extending between the external and internal surfaces of the impregnation mandrel, and at least one removable retaining device, the process comprising:

the production of a fibrous texture having a strip shape extending in a longitudinal direction over a predetermined length between a proximal part and a distal part and having a three-dimensional or multilayer woven structure between a plurality of layers of warp threads and a plurality of layers of weft threads (30), the proximal part of the fibrous texture comprising at least one attachment tab, each attachment tab having a thickness less than the thickness of the rest of the fibrous texture, the insertion of each attachment tab of the fibrous texture into an aperture corresponding to the impregnation mandrel, the fibrous texture being unwound from the storage mandrel and conveyed by the conveying device between the storage mandrel and the impregnation mandrel, the attachment by each removable retaining device of each tab inserted into each aperture against a surface of the impregnation mandrel, the winding under tension of the fibrous texture on the impregnation mandrel in order to obtain the fibrous preform.

The production of one or more attachment tabs at the proximal part of the fibrous texture allows for the attachment of the fibrous texture on the impregnation mandrel. This attachment is performed via the insertion of the tabs into respective apertures formed in the impregnation mandrel and by the use of removable devices for holding the tabs in place. Advantageously, this makes it possible to obviate any risk of slipping of the fibrous texture during its winding around the impregnation mandrel. Moreover, such a solution makes it possible to dispense with any use of tackifier. The preparation time of the installation with a view to the winding of the fibrous texture is therefore reduced, as well as the time for shaping of the preform. The absence of use of tackifier furthermore makes it possible to preserve the health of the operators.

According to an aspect of the process of the invention, the proximal part longitudinally comprises a gradual increase in thickness between each attachment tab and the rest of the fibrous texture.

According to another aspect of the process of the invention, the width of each attachment tab extends in a part of constant thickness of the fibrous texture.

According to another aspect of the process of the invention, each attachment tab is formed by two-dimensional weaving.

According to another aspect of the process of the invention, each removable device comprises an attachment screw or a clamping device configured to retain from the inside of the impregnation mandrel an attachment tab against a surface of the impregnation mandrel.

According to another aspect of the process of the invention, each removable retaining device is configured to retain an attachment tab against a surface extending between the internal surface and the external surface, or against the internal surface of the impregnation mandrel.

According to another aspect of the process of the invention, the fibrous texture further comprises a plurality of attachment tabs respectively inserted into a plurality of apertures and a plurality of removable devices for retaining the tabs.

According to another aspect of the process of the invention, the latter further comprises the cutting-out of at least one woven layer extracted from the fibrous texture and distinct from each attachment tab, before the insertion of each tab into the corresponding aperture of the impregnation mandrel.

The invention also proposes a process for impregnation of a fibrous preform for the production of a gas turbine casing made of composite material, implementing the steps of the process of shaping of a fibrous preform summarized above, the impregnation process further comprising the steps of:
- the withdrawal of each removable retaining device after the winding of the fibrous texture on the impregnation mandrel,
- the cutting-out of each attachment tab of the fibrous texture inserted into each aperture,
- the insertion of a blank into each aperture of the impregnation mandrel in such a way as to blank off each aperture following the cutting-out of each attachment tab,
- the impregnation of the fibrous preform with a resin.

BRIEF DESCRIPTION OF THE DRAWINGS

Other features and advantages of the invention will become apparent on reading the following description of particular embodiments of the invention, given by way of non-limiting example, with reference to the appended drawings, in which.

DETAILED DESCRIPTION OF THE EMBODIMENTS

The invention applies in general to the production of cylindrical fibrous preforms having a varying profile in radial section and which are able to constitute fibrous reinforcements, these preforms being intended to be used for the manufacturing of parts made of composite material of cylindrical shapes also having a varying profile and/or a variable thickness particularly in radial section. The radial section corresponds to a plane defined by the axial direction and the radial direction of the mandrel on which the preform is shaped. The axial direction $D_A$ and the radial direction $D_R$ are in particular indicated in FIG. 1. The parts are obtained by winding of a fibrous texture on an impregnation mandrel, injection of a fluid composition, such as a resin, into the fibrous preform thus constituted, then heat treatment of said composition in order to obtain the matrix.

Figure 1:
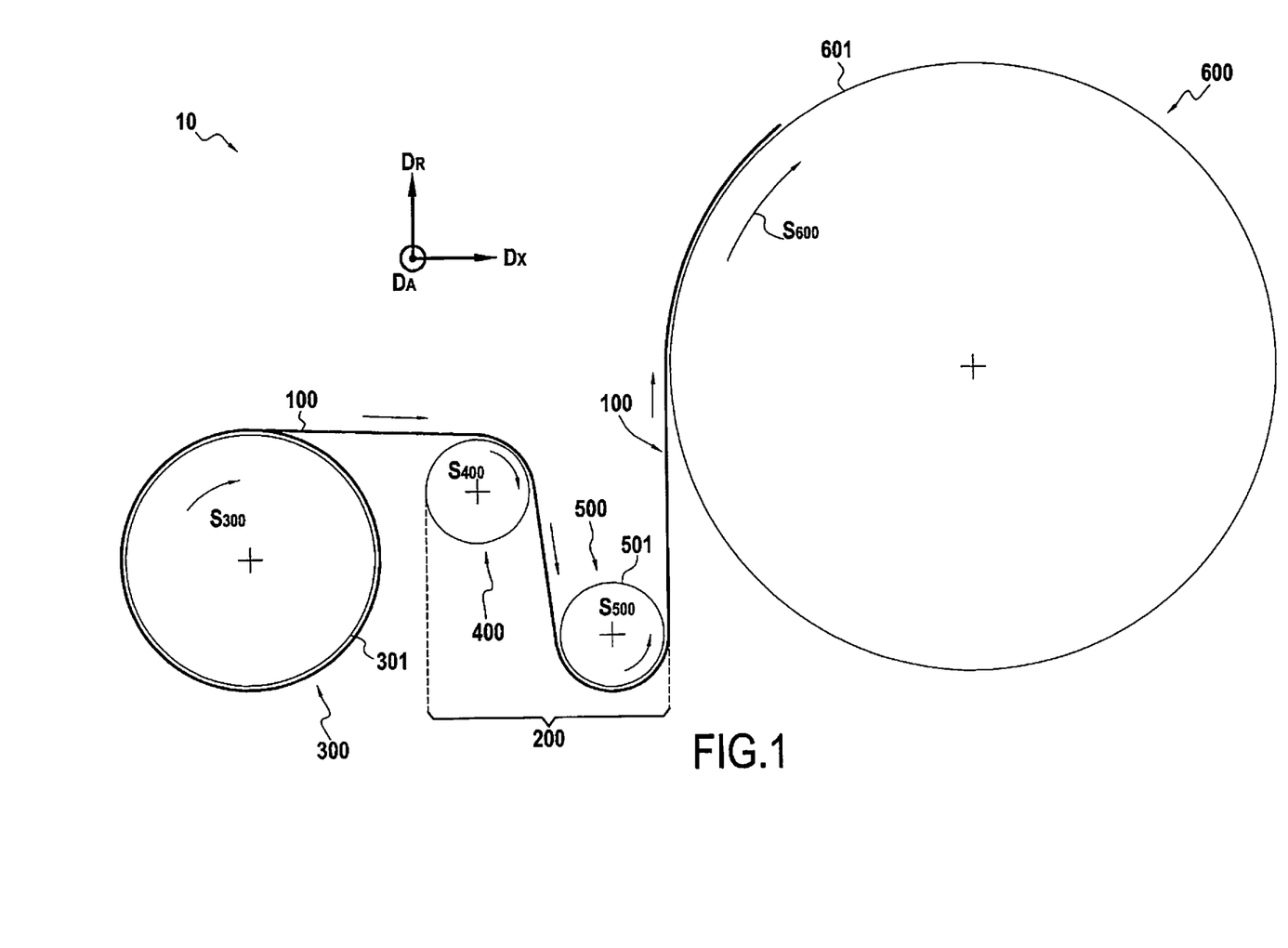
FIG. 1 is a schematic view of an installation for the shaping of a fibrous texture in accordance with an embodiment of the invention.

FIG. 1 represents an installation 10 for the shaping of a fibrous preform with varying shape in accordance with an embodiment of the invention.

The installation 10 comprises a storage mandrel 300 intended to store a fibrous texture 100 in the shape of a wound strip. A conveying device 200 is placed downstream of the storage mandrel 300 in the direction of travel of the fibrous texture 100. An impregnation mandrel 600, also called an injection mold, is arranged downstream of the conveying device 200. The fibrous texture 100 on the storage mandrel 300 is unwound from the latter to be shaped by winding on the impregnation mandrel 600, the winding being done under a controlled tension at the storage mandrel 300.

In the illustrated example, the conveying device 200 is formed of two follower rollers 400 and 500. However, it is understood that any other device capable of conveying the fibrous texture 100 between the storage mandrel 300 and the impregnation mandrel 600 can be envisioned. The device 200 can for example have a greater or lesser number of follower rollers.

Figure 2:
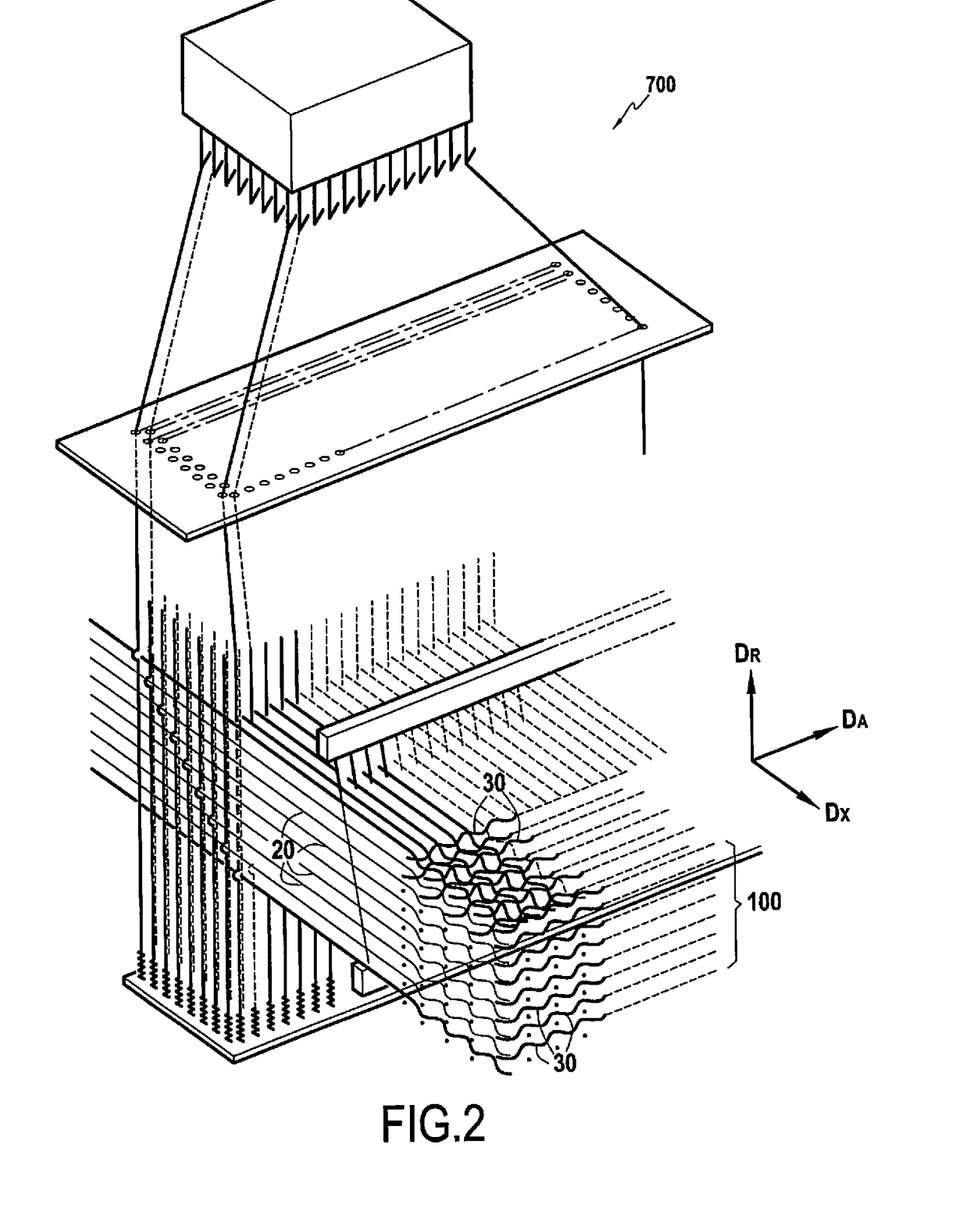
FIG. 2 is a schematic perspective view of a loom showing the three-dimensional weaving of a fibrous texture.

As represented in FIG. 2, the fibrous texture 100 is produced in a known manner by weaving by means of a weaving loom of jacquard type 700 on which has been disposed a bundle of warp threads 20 or strands in a plurality of layers, the warp threads being linked by weft threads or strands 30. The fibrous texture 100 is produced by three-dimensional weaving or by multilayer weaving.

The terms "three-dimensional weaving" or "3D" weaving are understood to mean a method of weaving by which at least some of the weft threads link warp threads 20 on several layers of warp threads or conversely. One example of three-dimensional weaving is so-called "interlock" frame weaving. The term "interlock" weaving is understood to mean a weaving frame wherein each layer of weft threads 30 links several layers of warp threads 20 with all the threads of one and the same weft column having the same movement in the plane of the frame. The term "multilayer weaving" denotes 3D weaving with several layers of warp threads 20, for which the base frame of each layer is equivalent to a conventional 2D fabric frame, such as a frame of canvas, satin or serge type, but with certain points of the frame that link the layers of warp together or conversely.

The production of the fibrous texture 100 by 3D or multilayer weaving makes it possible to obtain a connection between the layers, and thus to have correct mechanical withstand of the fibrous texture 100 and of the composite material part obtained. The fibrous texture 100 can in particular be woven from threads of carbon fiber, ceramics such as silicon carbide, glass, or else aramid.

In a known manner, in order to produce a fibrous texture 100 adapted to the varying shape of the fibrous preform to be formed on the impregnation mandrel 600, one uses a shaping weaving, also called "contour weaving", which consists in taking up a different length of warp threads 20 as a function of their position over the width of the fibrous texture 100 woven in the shape of a strip. For this purpose, one or more take-up rollers are used at the extraction of the loom 700 which have over their axial length, defined in a direction $D_A$, a variable radius defining an external surface with a raised profile making it possible to take up different lengths of warp threads 20 as a function of their position over the width of the fibrous texture 100, a greater length of warp thread being taken up by the party or parties of a take-up roller having a greater radius than the rest of the roller. The differential take-ups produced by the take-up rollers collide with one another when the weaving cell of the loom 700 by pulling the right length of warp thread 20 before the insertion of the next column of weft threads 30. The texture thus woven is wound on the storage mandrel 300, also called a "take-up" mandrel, located downstream of the take-up rollers. The fibrous texture 100 is thus stored with a view to its subsequent shaping on the impregnation mandrel 600.

Figure 3:
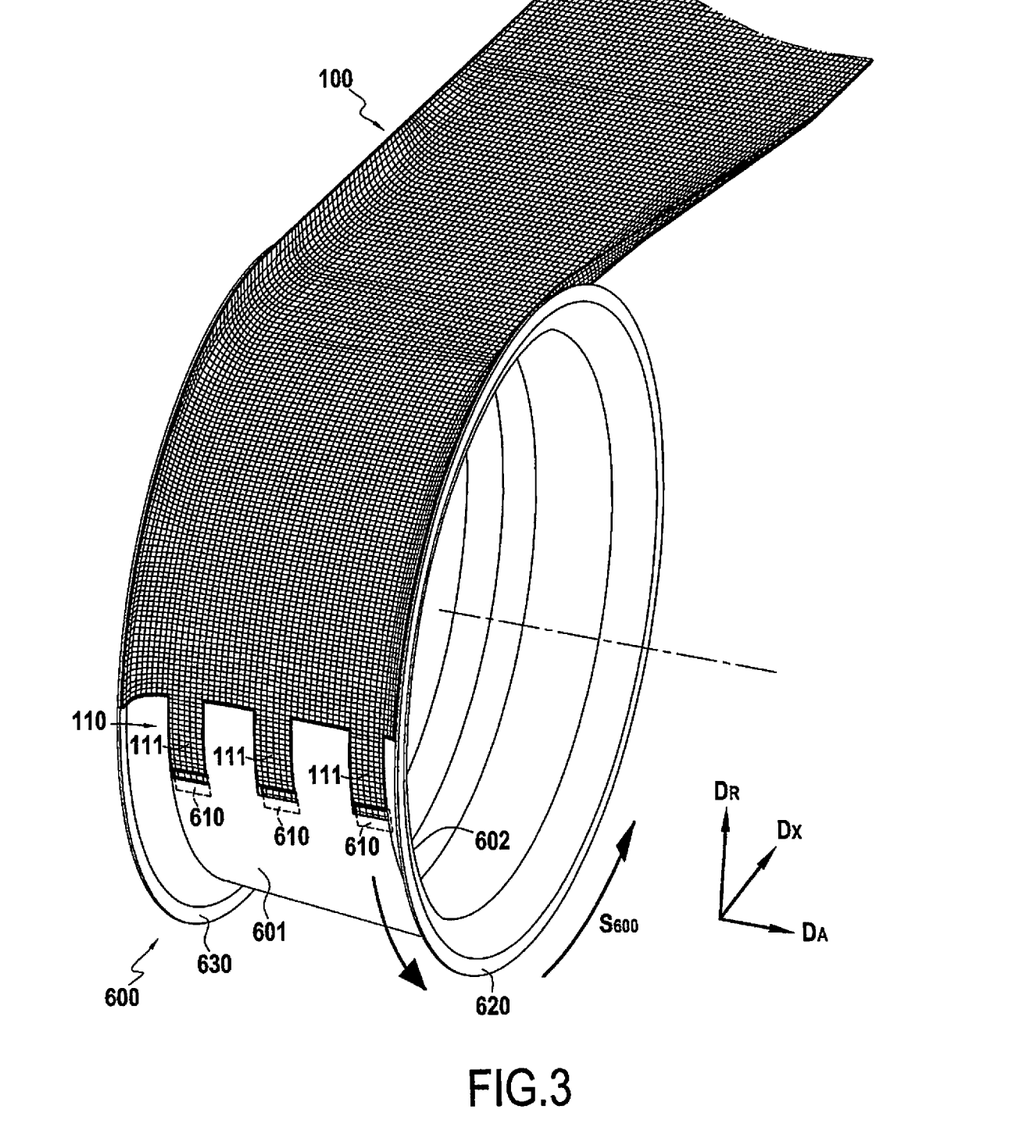
FIG. 3 is a schematic perspective view showing the winding of a fibrous texture on an impregnation mandrel constituting the installation in FIG. 1 in accordance with an embodiment of the invention.

As illustrated in FIG. 3, the fibrous preform is shaped by winding on the impregnation mandrel 600 of the fibrous texture 100. The fibrous texture 100 forms a strip having along the axial direction $D_A$ a varying profile, that is to say a variation in shape and/or thickness in cross-section. The impregnation mandrel 600 has in radial section a profile corresponding to that of the part to be produced which corresponds in the example described here to a fan casing of an aeronautical engine.

For this purpose, the impregnation mandrel 600 has an external surface 601, the raised profile of which corresponds to the internal surface of the casing to be produced, and an internal surface 602 opposite the external surface 601. By its winding on the impregnation mandrel 600, the fibrous texture 100 follows the profile thereof. The impregnation mandrel 600 also contains two flanges 620 and 630 to form parts of fibrous preform corresponding to the flanges of the casing to be manufactured. The impregnation mandrel 600 can be rotationally driven in the direction of rotation $S_{600}$, for example by an electric motor (not shown), whereas the fibrous texture 100 is tensioned between the storage mandrel 300 and the impregnation mandrel 600.

In the illustrated example, the first and second follower rollers 400 and 500 forming the conveying device 200 can be driven by the fibrous texture 100 respectively following directions of rotation $S_{400}$ and $S_{500}$ indicated on FIG. 1. They have over their axial width, defined along the direction $D_A$, a variable radius in such a way as to respectively define external surfaces 401, 501 having a raised profile corresponding to the intended profile for the fibrous preform to be produced.

The storage mandrel 300, can be mainly rotationally driven in the direction of rotation $S_{300}$ and also has over its axial width a variable radius in such a way as to define an external surface 301 having a raised profile corresponding to the profile intended for the fibrous preform in order to limit the distortion of the fibrous texture 100 during its storage. As the storage mandrel 300 provides the tensioning of the fibrous texture 100 during its winding, its rotation can be momentarily stopped or reversed with respect to the direction of rotation $S_{300}$ in order to maintain the tension on the texture during its winding on the impregnation mandrel 600.

Figure 4:
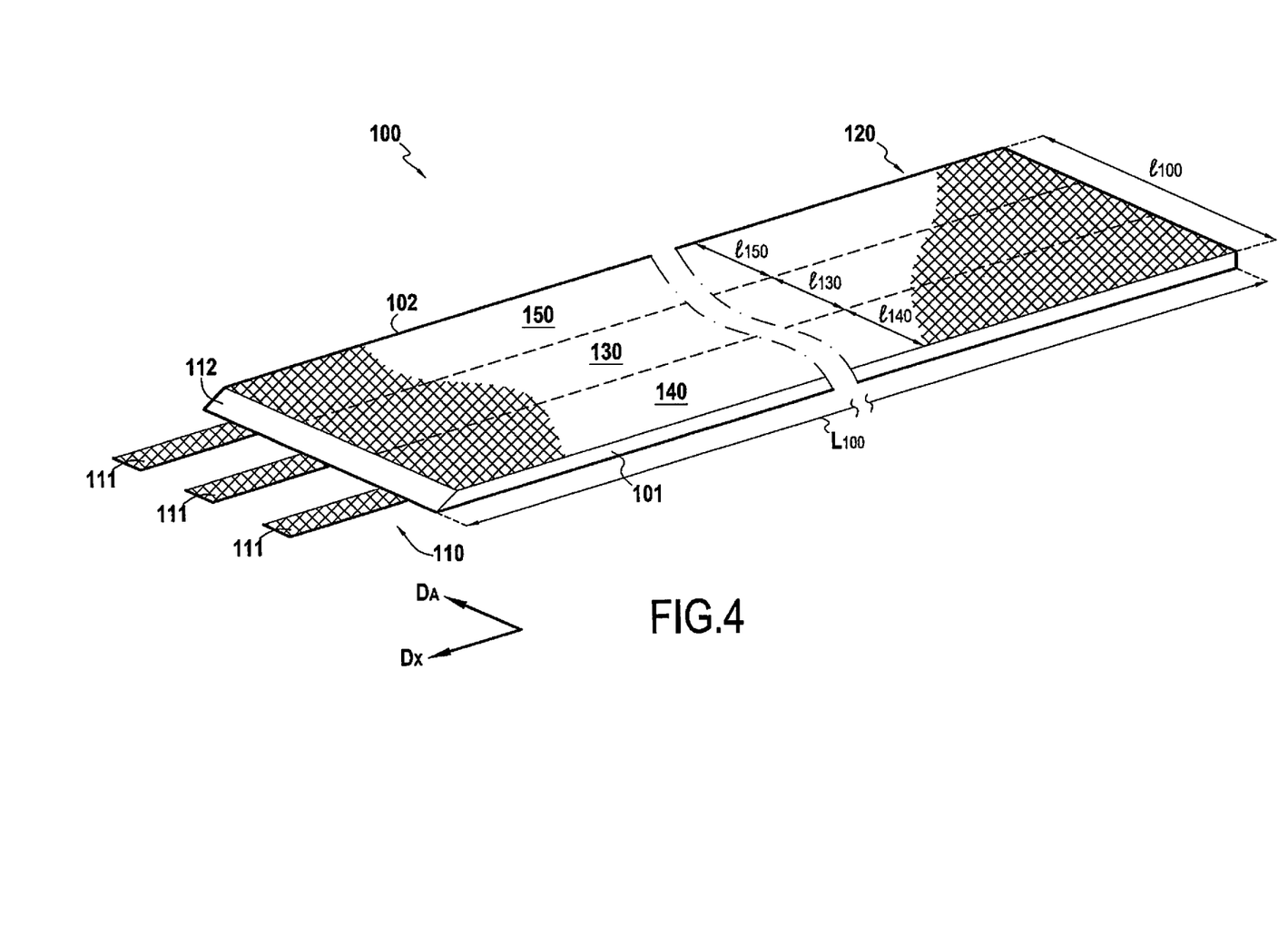
FIG. 4 is a schematic perspective view of a fibrous texture in accordance with an embodiment of the invention.

As explained in the introductory part, the fibrous texture 100 can present a slipping risk during its winding around the impregnation mandrel 600. To obviate this risk, the fibrous texture 100 can be produced as illustrated in FIG. 4.

As illustrated in this figure, the fibrous texture 100 has a strip shape which extends lengthwise in a longitudinal direction $D_X$ corresponding to the direction of travel of the threads or strands of warp 20 and widthwise or transversally in the lateral direction $D_A$ between a first and a second lateral edge 101 and 102, the lateral direction $D_A$ corresponding to the direction of the weft 30 threads or strands. The fibrous texture 100 extends longitudinally over a predetermined length $L_{100}$ in the direction $D_X$ between a proximal part 110 intended to form the start of the winding of a fibrous preform on a shaping tool, here the impregnation mandrel 600, and a distal part 120 intended to form the end of the winding of the fibrous preform, the proximal and distal parts overlapping one another in the winding. The fibrous texture 100 furthermore has a central area 130 extending over a predetermined width $I_{130}$ in the direction $D_A$, the central area 130 being intended to form the barrel or ferrule of the casing. The central area 130 is delimited between two lateral areas 140 and 150 each extending over a predetermined width $I_{140}$, $I_{150}$ in the direction $D_A$ and over a predetermined length in the direction $D_X$, the lateral areas 140 and 150 being intended at least in part to form the annular flanges of the casing.

In accordance with the invention, the proximal part 110 of the fibrous texture 100 includes at least one attachment tab 111, three in the example illustrated, it being possible to envision a greater or lesser number of tabs. Each attachment tab 111 can have a thickness less than the thickness of the rest of the fibrous texture 100, and is for example made from a dropped area of the fibrous texture 100 which has been woven as a supplement. As will be explained further on, the fact that each attachment tab 111 has a thickness less than the rest of the fibrous texture 100 will make it possible to facilitate the subsequent cutting-out of these. Still with a view to facilitating their cutting-out, the width along the direction $D_A$ of each attachment tab 111 can possibly, but not necessarily, extend in a part of constant thickness of the fibrous texture 100.

The proximal part 110 of the fibrous texture 100 can where applicable comprise in the longitudinal direction $D_X$ a gradual increase in thickness between each attachment tab 111 and the rest of the fibrous texture 100. In other words, the proximal part 110 of the fibrous texture 100 can comprise a wedge shape 112, also called "scarf", which makes it possible to gradually reduce the thickness of the fibrous texture 100 until a minimum thickness is obtained corresponding to the thickness of each attachment tab 111.

Figure 5:
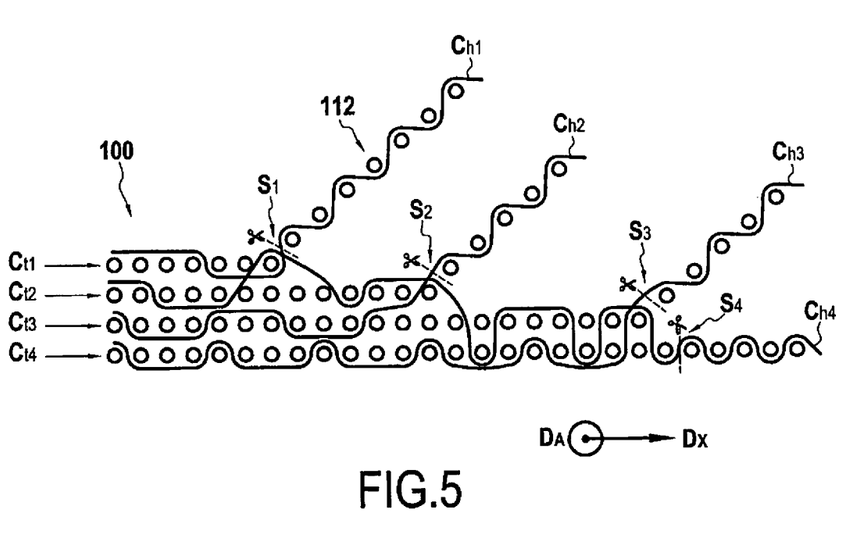
FIG. 5 is a schematic view showing an exemplary embodiment of a gradual reduction in thickness in the fibrous texture of FIG. 4 making it possible to obtain wedge-shaped edge.
Figure 6:
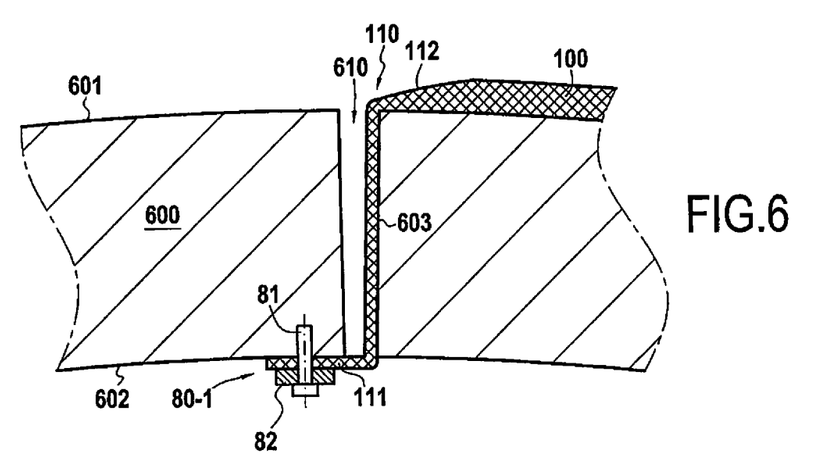
FIG. 6 is a partial radial section view of the impregnation mandrel of FIG. 1, illustrating an example of a removable device ensuring the retaining of the fibrous texture against the impregnation mandrel in accordance with an embodiment of the invention.
Figure 7:
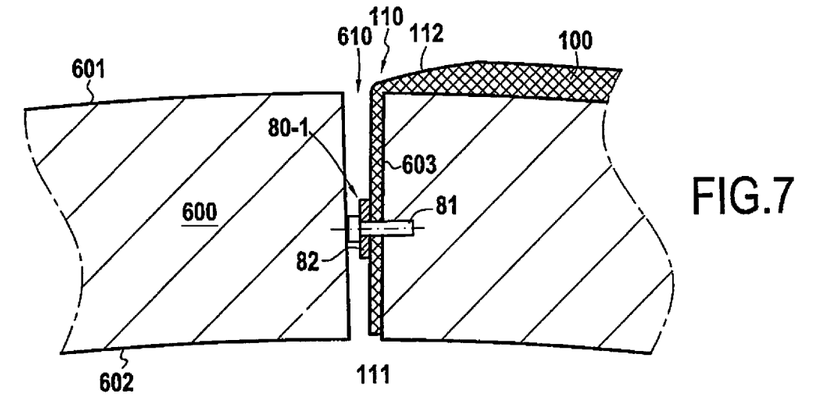
FIG. 7 is a partial radial section view of the impregnation mandrel of FIG. 1, illustrating another example of a removable device ensuring the retaining of the fibrous texture against the impregnation mandrel in accordance with an embodiment of the invention.
Figure 8:
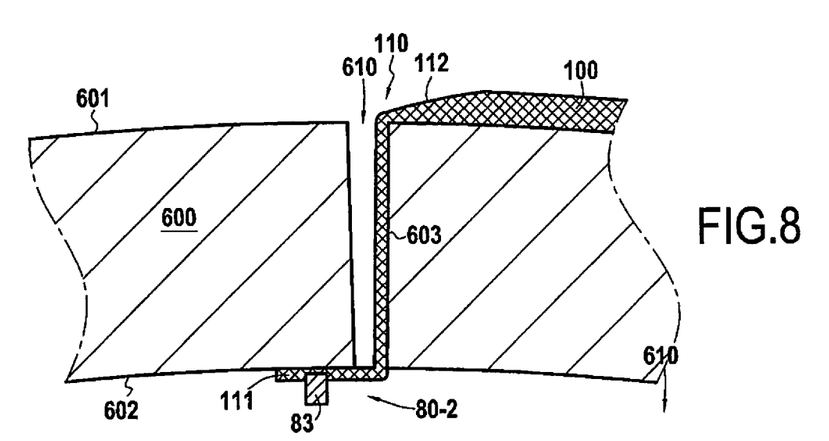
FIG. 8 is a partial radial section view of the impregnation mandrel of FIG. 1, illustrating another example of a removable device ensuring the retaining of the fibrous texture against the impregnation mandrel in accordance with an embodiment of the invention.
Figure 9:
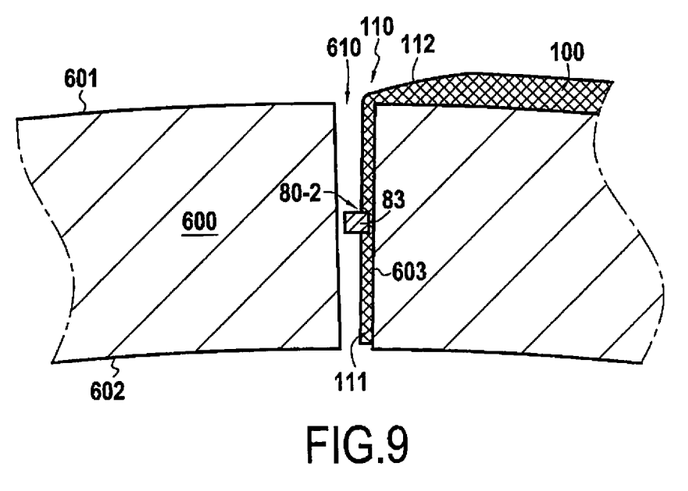
FIG. 9 is a partial radial section view of the impregnation mandrel of FIG. 1, illustrating another example of a removable device ensuring the retaining of the fibrous texture against the impregnation mandrel in accordance with an embodiment of the invention.

FIG. 5 illustrates an exemplary embodiment of a wedge shape 112 for the fibrous texture 100. The wedge shape 112 is obtained by producing gradual layer extractions in the fibrous texture 100 and by cutting out each of the layers extracted from the fibrous texture. More precisely, on FIG. 5 the fibrous texture 100 includes 4 layers of warp threads $C_{h1}$ to $C_{h4}$ linking together 4 layers of weft thread $C_{t1}$ to $C_{t4}$. The weaving of the fibrous texture 100 is modified at the moment of extraction of the layers in order to permit the extraction of a layer of warp threads with the corresponding layer of weft threads. The weaving of the warp threads belonging to the layer of warp threads $C_{h1}$ changes from a three-dimensional woven structure to a two-dimensional woven structure with the layer of weft threads $C_{t1}$ at the level of the extraction point $S_1$ from which the layer of warp threads $C_{h1}$ and the layer of weft threads $C_{t1}$ are extracted from the fibrous texture, these layers being cut out at the level of the extraction point $S_1$. The same modification of the woven structure is produced between the layers $C_{h2}$ and $C_{t2}$, $C_{h3}$ and $C_{t3}$, and $C_{h4}$ and $C_{t4}$ respectively at the level of the extraction points $S_2$, $S_3$ and $S_4$ from which the layers $C_{h2}$ and $C_{t2}$, $C_{h3}$ and $C_{t3}$, and $C_{h4}$ and $C_{t4}$ are extracted from the fibrous texture 100. The extraction points $S_1$ to $S_4$ being offset with respect to one another in the direction $D_X$, a gradual reduction in thickness is thus produced, making it possible to obtain a longitudinal edge of wedge shape 112. This wedge shape 112 makes it possible to avoid an excessively sudden transition during the stacking of the first turns of the fibrous texture 100 on the proximal part 110. Each attachment tab 111 is then formed by two-dimensional weaving of the layers $C_{h4}$ and $C_{t4}$. Advantageously, the use of a two-dimensional woven structure for each attachment tab 111 makes it possible to facilitate the subsequent cutting-out of these. The production of a three-dimensional woven structure for each attachment tab 111 does however remain possible. Thus, more generally, the wedge 112 can be obtained by the cutting-out of at least one woven layer extracted from the fibrous texture 100, this layer being distinct from the attachment tab 111. Each attachment tab 111 can then be woven in the extension of the minimum thickness of the wedge 112 in such a way as to have a minimized number of layers, with a view to facilitating its cutting-out.

As illustrated in FIGS. 3, 6, 7, 8 and 9 the impregnation mandrel 600 comprises one or more apertures 610. Each aperture 610 extends between the external surface 601 and the internal surface 602 of the impregnation mandrel 600 and is produced in such a way as to allow the insertion of a corresponding attachment tab 111 through it.

The installation 10 further comprises one or more removable devices 80-1, 80-2 for retaining the attachment tabs 111. Each removable device 80-1, 80-2 is configured to retain from the inside of the impregnation mandrel 600 an attachment tab 111, inserted into a corresponding aperture 610, against a surface of the impregnation mandrel 600. In a first example illustrated in FIGS. 6 and 8, the surface of the impregnation mandrel 600 against which the attachment tab 111 is maintained can be the internal surface 602 of the mandrel. This first example has the advantage of proposing the retainment of the attachment tab 111 independent of the width of the aperture 610. In a second example illustrated in FIGS. 7 and 9, the surface of the impregnation mandrel 600 against which the attachment tab 111 is retained can be a surface 603 extending between the external surface 601 and the internal surface 602, i.e. a surface 603 partly delimiting the aperture 610. This second example has the advantage of being able to reduce the length of each attachment tab 111. For this second example, care is taken to adapt the width of the aperture 610 in order to permit the placement of the removable device 80-1, 80-2 of retainment via the inside of the impregnation mandrel 600.

Various removable retaining devices 80-1, 80-2 can be envisioned. In the example illustrated in FIGS. 6 and 7, the removable device 80-1 is of screw/nut type and retains using an attachment screw 81 the tab 111 respectively against the internal surface 602 or the surface 603 of the impregnation mandrel 600. In order to improve this retainment, an attachment plate 82 can where applicable be disposed between an internal face (i.e. facing the mandrel) of the attachment tab 111 and the attachment screw 81. The plate 82 is capable of being tightened against the tab 111 by means of the attachment screw 81, in such a way as to exert a clamping force on the attachment tab 111, this force being exerted between the internal surface 602 of the impregnation mandrel 600 and the plate 82. In another example illustrated in FIGS. 8 and 9, the removable device 80-2 comprises a clamping device 83, such as clamps bearing on at least one of the flanges 620, 630 of the impregnation mandrel 600 and then retaining, by clamping, the tab 111 respectively against the internal surface 602 or the surface 603 of the impregnation mandrel 600.

The obtainment of a fibrous preform 800 from the fibrous texture 100 is performed as follows. The fibrous texture 100 is unwound from the storage mandrel 300 and conveyed toward the impregnation mandrel 600 using the conveying device 200. Each attachment tab 111 of the fibrous texture 100 is then inserted into a corresponding aperture 610 of the impregnation mandrel 600. After insertion, each attachment tab 111 is attached against a surface of the impregnation mandrel 600, for example the internal surface 602 or the surface 603, using a removable device 80-1, 80-2. The fibrous texture 100 is then unwound under tension around the impregnation mandrel 600, until the obtainment of a fibrous preform 800, illustrated by way of example in FIG. 10.

Figure 10:
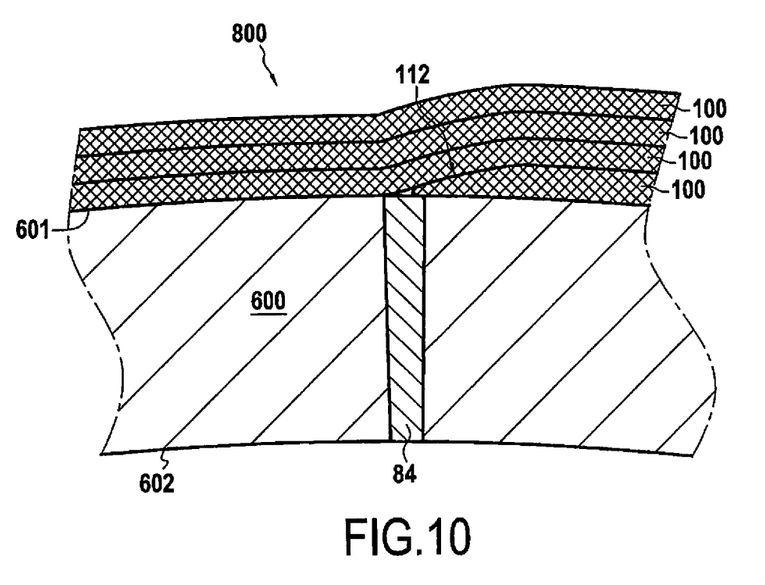
FIG. 10 is a partial radial section view of the impregnation mandrel of FIG. 1, showing a preform for shaping on the basis of the windings of the fibrous texture around the impregnation mandrel in accordance with an embodiment of the invention.

Once all the layers of fibrous texture 100 are wound on the impregnation mandrel 600, each removable device 80-1, 80-2 is then withdrawn from the inside of the mandrel. For this purpose, the attachment screws 81, attachment plates 82 and/or clamping devices 83 are withdrawn so as to leave free each attachment tab 111 inserted into each aperture 610. Each attachment tab 111 then projects toward the inside of the impregnation mandrel 600. Each attachment tab 111 then undergoes a cutting-out operation from the inside of the impregnation mandrel 600, for example using a Stanley knife blade. This cutting-out operation is facilitated by the fact that the attachment tabs 111 have a lower thickness vis-à-vis the rest of the fibrous texture 100. As illustrated in FIG. 10, once the cutting-out of each attachment tab 111 is carried out, a blank 84 is inserted into each aperture 610 of the impregnation mandrel, in such a way as to blank them off.

Figure 11:
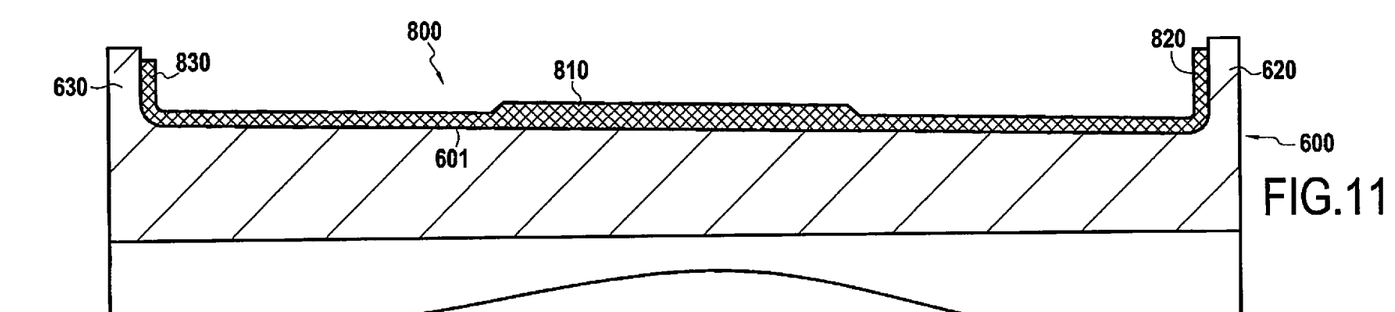
FIG. 11 is an axial section half view of a casing preform obtained by winding the fibrous texture on the impregnation mandrel in accordance with an embodiment of the invention.

FIG. 11 shows a section view of the fibrous preform 800 obtained after winding of the fibrous texture 100 in several layers on the impregnation mandrel 600, the view showing the preform in the area of overlap between the distal part 120 and the proximal part 110 of the fibrous texture 100. The number of layers or twists is a function of the desired thickness and the thickness of the fibrous texture 100. It is preferably at least equal to 2. In the example illustrated in FIG. 10, the preform 800 comprises four layers of fibrous texture 100. On this figure can also be seen a wedge shape 112 ("scarf") produced at the level of the proximal part 110 of the fibrous texture 100, this wedge 112 having the advantage of avoiding an excessively sudden transition during the stacking of the first turns of the fibrous texture 100 on the proximal part 110.

A fibrous preform 800 is obtained with a central part 810 and end parts 820, 830 of lesser thickness corresponding to the flanges of the casing to be produced.

The densification of the fibrous preform 800 is produced by a matrix. The densification of the fibrous preform 800 consists in filling the porosity of the preform, in all or part of the volume thereof, with the constituent material of the matrix.

The matrix can be obtained in a manner known per se following the process by liquid means.

The process by liquid means consists in impregnating the preform with a liquid composition containing an organic precursor of the matrix material. The organic precursor usually takes the form of a polymer, such as a resin, where applicable diluted in a solvent. The fibrous preform 800 is placed in a mold, here on the impregnation mandrel 600, which can be closed in an airtight manner with a housing having the shape of the molded final part.

Figure 12:
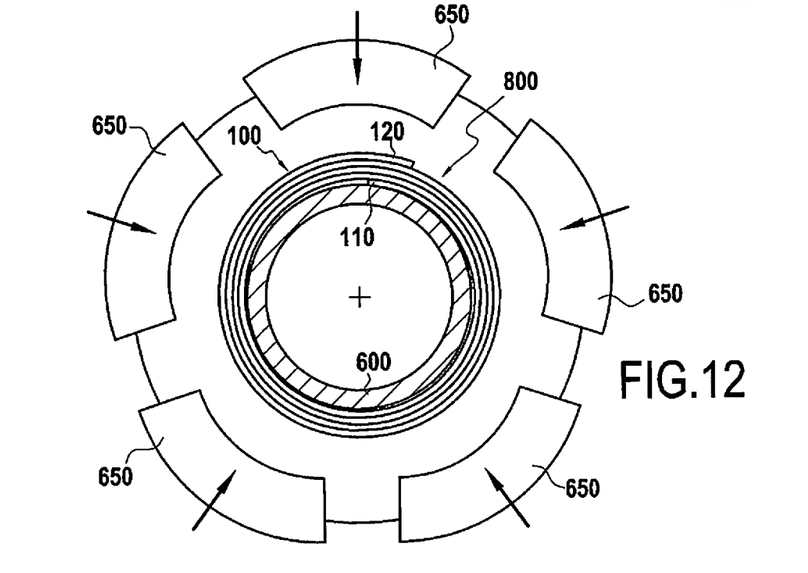
FIG. 12 is a section view showing the positioning of the injection sectors on the preform of the casing of FIG. 11.

As illustrated in FIG. 12, the fibrous preform 800 is here placed between a plurality of sectors 650 forming a counter-mold and the impregnation mandrel 600 forming a support, these elements respectively having the external shape and the internal shape of the casing to be produced. Then, the matrix liquid precursor is injected, for example a resin, into the entire housing to impregnate the whole fibrous part of the preform.

The conversion of the precursor into an organic matrix, namely its polymerization, is performed by heat treatment, generally by heating of the mold, after elimination of any solvent and cross-linking of the polymer, the preform being always retained in the mold having a shape corresponding to that of the part to be produced. The organic matrix can be notably obtained from epoxy resins, such as, for example the high-performance epoxy resin on sale, or liquid precursors of carbon or ceramic matrices.

In the case of the formation of a carbon or ceramic matrix, the heat treatment consists in pyrolyzing the organic precursor to convert the organic matrix into a carbon or ceramic matrix according to the precursor used and the conditions of pyrolysis. By way of example, carbon liquid precursors can be resins with a relatively high degree of coke, such as phenolic resins, whereas ceramic liquid precursors, notably of SiC, can be resins of polycarbosilane (PCS) or polytitanocarbosilane (PTCS) or polysilazane (PSZ) type. Several consecutive cycles, from the impregnation to the heat treatment, can be performed to achieve the degree of densification desired.

According to an aspect of the invention, the densification of the fibrous preform can be produced by the well-known process of transfer molding, so-called RTM (Resin Transfer Molding). In accordance with the RTM process, the fibrous preform is placed in a mold having the shape of the casing to be produced. A thermosetting resin is injected into the internal space delimited between the part made of rigid material and the mold and which comprises the fibrous preform. A pressure gradient is generally established in this internal space between the place where the resin is injected and the orifices of evacuation of the resin in order to control and optimize the impregnation of the preform with the resin.

The resin may be, for example, an epoxy resin. The resins suitable for RTM processes are well-known. They preferably have a low viscosity to facilitate their injection into the fibers. The choice of the temperature class and/or the chemical nature of the resin is determined according to the thermomechanical stresses to which the part must be submitted. Once the resin is injected into the entire reinforcement, it is polymerized by heat treatment in accordance with the RTM process.

Figure 13:
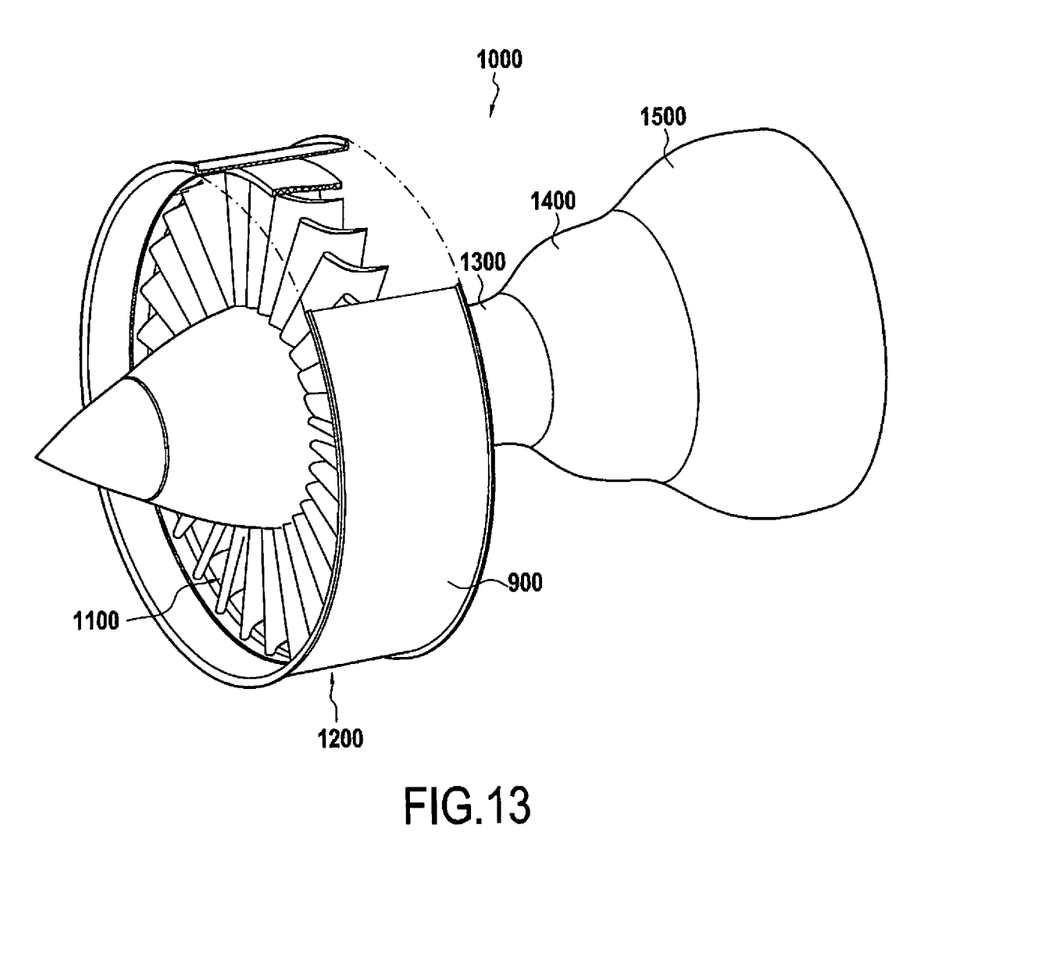
FIG. 13 is a perspective view of an aeronautical engine in accordance with an embodiment of the invention.

After the injection and polymerization, the part is unmolded. Finally, the part is trimmed to remove the excess resin and the chamfers are used to obtain a casing 900 having a cylindrical shape as illustrated in FIG. 13. The casing 900 represented in FIG. 13 is a casing of a fan of a gas turbine aeronautical engine 1000. Such an engine, as shown very schematically by FIG. 13 comprises, from upstream to downstream in the direction of flow of the gas stream, a fan 1100 disposed at the engine intake, a compressor 1200, a combustion chamber 1300, a high-pressure turbine 1400 and a low-pressure turbine 1500. The engine is housed inside a casing comprising several parts corresponding to different elements of the engine. Thus, the fan 1000 is surrounded by the casing 900.

The invention claimed is:

1. A process for shaping a fibrous preform implementing an installation comprising a storage mandrel intended to store a fibrous texture in a form of a wound strip, an impregnation mandrel comprising an external surface and an internal surface opposite the external surface, a device for conveying the fibrous texture between the storage mandrel and the impregnation mandrel, inserted into at least one aperture extending between the external and internal surfaces of the impregnation mandrel, and at least one removable retaining device, the process comprising:
  producing a fibrous texture having a strip shape extending in a longitudinal direction ($D_X$) over a predetermined length between a proximal part and a distal part and having a three-dimensional or multilayer woven structure between a plurality of layers of warp threads and a plurality of layers of weft threads, the proximal part of the fibrous texture comprising at least one attachment tab, each attachment tab having a thickness less than the thickness of the rest of the fibrous texture,
  inserting each attachment tab of the fibrous texture into an aperture corresponding to the impregnation mandrel, the fibrous texture being unwound from the storage mandrel and conveyed by the conveying device between the storage mandrel and the impregnation mandrel, attaching, by each removable retaining device, each tab inserted into each aperture against a surface of the impregnation mandrel, winding under tension the fibrous texture on the impregnation mandrel in order to obtain the fibrous preform.

2. The process as claimed in claim 1, wherein the proximal part longitudinally comprises a gradual increase in thickness between each attachment tab and the rest of the fibrous texture.

3. The process as claimed in claim 1, wherein the width of each attachment tab extends in a part of constant thickness of the fibrous texture.

4. The process as claimed in claim 1, wherein each attachment tab is formed by two-dimensional weaving.

5. The process as claimed in claim 1, wherein each removable device comprises an attachment screw or a clamping device configured to retain from the inside of the impregnation mandrel each attachment tab against a surface of the impregnation mandrel.

6. The process as claimed in claim 1, wherein each removable retaining device is configured to retain an attachment tab against a surface extending between the internal surface and the external surface, or against the internal surface of the impregnation mandrel.

7. The process as claimed in claim 1, wherein the fibrous texture comprises a plurality of tabs respectively inserted into a plurality of apertures, the installation further comprising a plurality of removable devices for retaining the tabs.

8. The process as claimed in claim 1, further comprising cutting-out at least one woven layer extracted from the fibrous texture and distinct from each attachment tab, before the insertion of each tab into the corresponding aperture of the impregnation mandrel.

9. A process for impregnation of a fibrous preform for the production of a gas turbine casing made of composite material, implementing the steps of the process of shaping of a fibrous preform as claimed in claim 1, the impregnation process further comprising:

withdrawing each removable retaining device after the winding of the fibrous texture on the impregnation mandrel, cutting-out each attachment tab of the fibrous texture inserted into each aperture, inserting a blank into each aperture of the impregnation mandrel in such a way as to blank off each aperture following the cutting-out of each tab, impregnating the fibrous preform with a resin.

10. The process as claimed in claim 2, wherein the width of each attachment tab extends in a part of constant thickness of the fibrous texture.

* * * * *